United States Patent [19]

Voitas

[11] 4,087,137
[45] May 2, 1978

[54] DRILL BUSHING AND SIMILAR ARTICLE

[75] Inventor: Edward J. Voitas, Mahwah, N.J.

[73] Assignee: Eastern Fusecoat Incorporated, Mahwah, N.J.

[21] Appl. No.: 603,242

[22] Filed: Aug. 8, 1975

[51] Int. Cl.² ............................................ F16C 33/04
[52] U.S. Cl. ................................ 308/237 R; 308/241; 308/DIG. 8
[58] Field of Search .................... 308/238, 237 R, 241, 308/DIG. 4, DIG. 8, 4, 8.2

[56] References Cited
U.S. PATENT DOCUMENTS

| | | | |
|---|---|---|---|
| 3,206,264 | 9/1965 | Dalzell et al. | 308/DIG. 8 |
| 3,915,514 | 10/1975 | Hudson | 308/DIG. 8 |
| 3,972,576 | 8/1976 | Hill | 308/DIG. 8 |

Primary Examiner—Richard A. Bertsch
Attorney, Agent, or Firm—Samuelson & Jacob

[57] ABSTRACT

A drill bushing or similar article, such as a pump bushing having a hardened body of steel and a thin inner coating of tungsten carbide distributed throughout a matrix of nickel chrome which provides a metallurgical bond to the steel body and a metallic bond to the particles of tungsten carbide. The drill bushing or similar article will have the wear characteristic of the solid tungsten carbide article, but would retain the coefficient of expansion characterisic of steel with the steel body eliminating the brittleness experienced in solid tungsten carbide articles.

21 Claims, 19 Drawing Figures

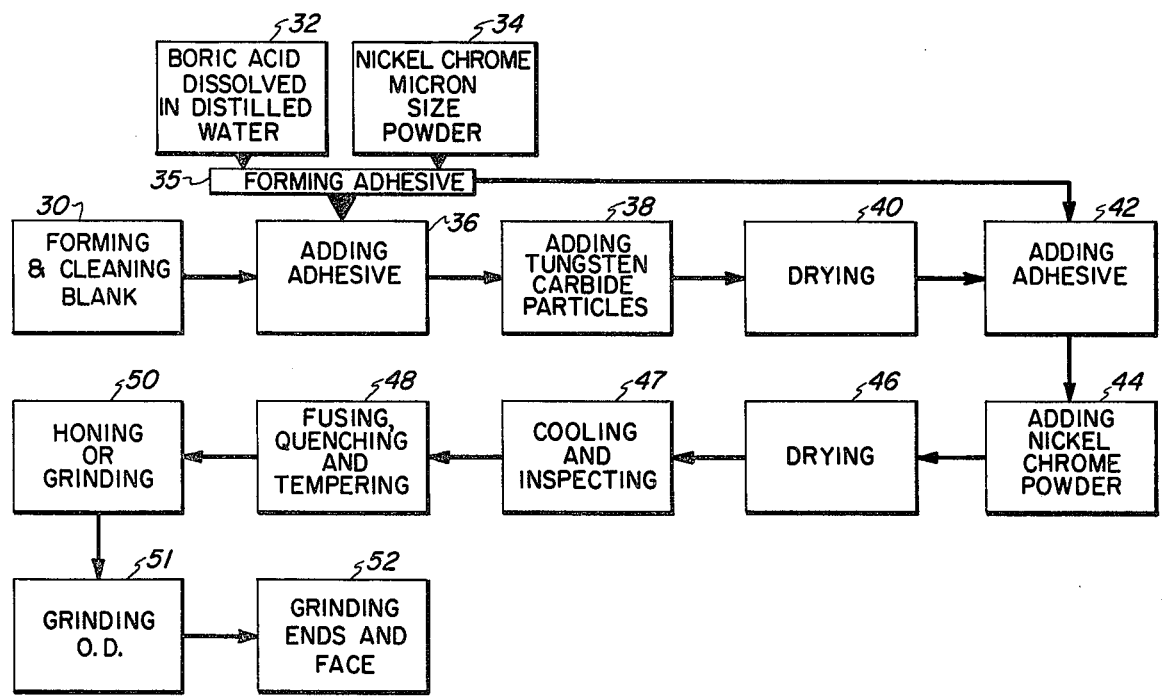
FIG. 1
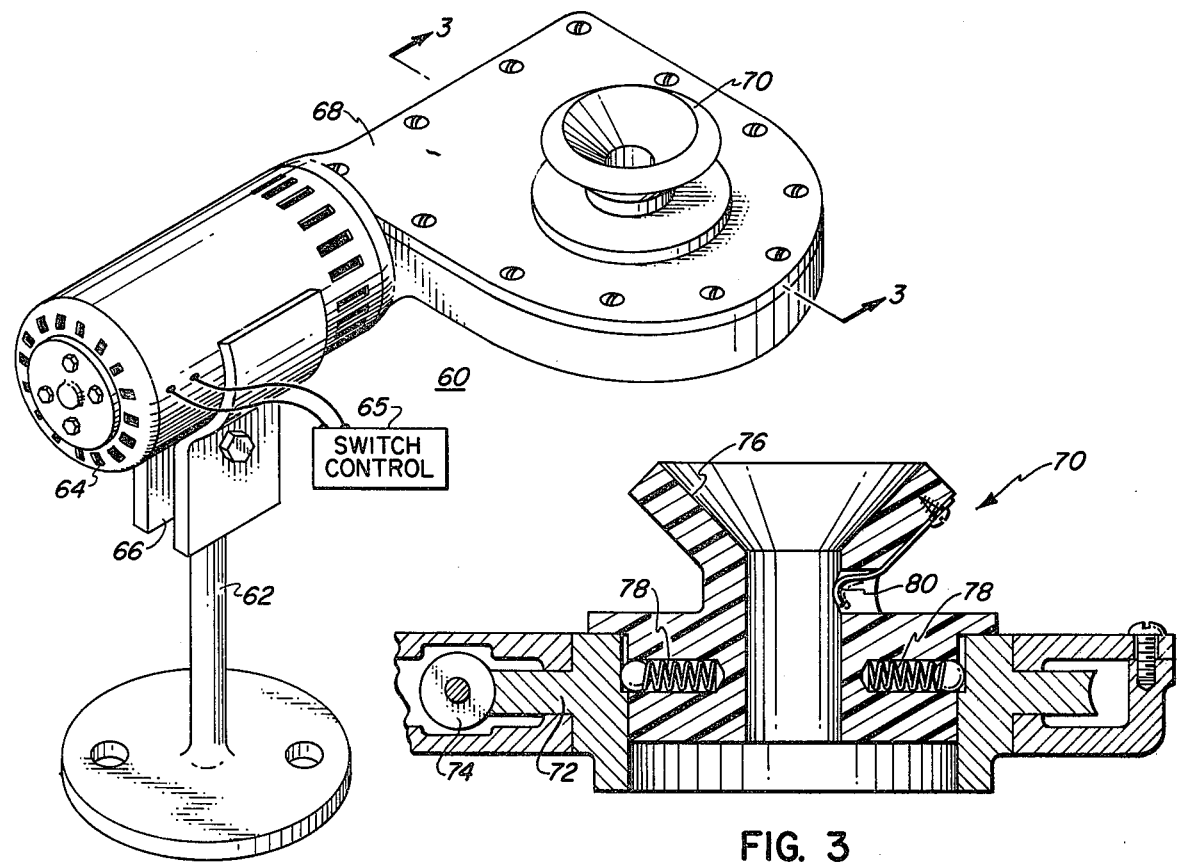
FIG. 2
FIG. 3

U.S.Patent May 2, 1978 Sheet 2 of 4 4,087,137

DRILL BUSHING AND SIMILAR ARTICLE

The invention relates to articles of manufacture such as drill bushings which are used throughout industry and are commonly incorporated into drill jigs. While the principal thrust of the invention is directed toward providing devices which are commonly referred to as drill bushings, it is also within the scope of the invention to provide pump seals, bearings, guide bushings, spray nozzles and similar articles.

Drill jigs are used to insure the accurate location of a hole, which is to be drilled into a work piece with respect to a fixed reference point or with respect to another hole or pattern of holes. This reference point is used to maintain accurate location of a pattern of holes in the work piece or part which is accurately reproducible over a long production run of such parts. In order to maintain this accurate, small tolerance condition, it is necessary to guide the drills to very close tolerances and to maintain these tolerances throughout the production. This is accomplished by using articles of the invention as drill jig bushings.

The prior art drill jig bushings have been and generally are made of high carbon or alloyed tool steel which have been heat treated to improve hardness. Such bushings provide reasonable drill guidance over their life. The life is relatively short because it is limited by the wear resistance characteristics of the metal. Attempts have been made to improve wear life by using high speed steel of various specialized alloys. These drill jig bushings are much more expensive and leave much to be desired in terms of wear life when they are used, for example, in the drilling of material containing asbestos or other abrasives such as encountered in cast iron.

Alternatively, when long wear life has been the critical element in a production problem, industry has turned to solid tungsten carbide drill bushings. These bushings which are usually solid throughout their cross-section, have several disadvantages. First and foremost, the cost is about 10 to 20 times that of high speed steel. Second, these parts are brittle and are often damaged during installation in the drill jig or are chipped by the tool itself. Various attempts, having limited commercial success, have been made to fabricate a tungsten carbide liner adapted to be pressed or brazed into a steel or other metal body. These units, too, are quite expensive being about 10 to 20 times the cost of tool steel bushings. Moreover, these units which use tungsten carbide fully-inserted bushings or rings brazed, welded or mechanically held in place in a tool or alloy steel body, have sufficient mass of tungsten carbide so that the coefficient of expansion characteristics of tungsten carbide control the expansion of the bushing. Thus, when tool steel tools are used with these bushings, the difference between the coefficient of expansion of the bushing and the coefficient of expansion of the tool, may produce tool seizure. Tool seizure results from the fact that as the tool heats up, its coefficient of expansion is such that it expands at twice the rate of the solid carbide bushing or the one with large inserted masses of tungsten carbide in the form of sleeves or rings. Therefore, initial clearance must be sufficient to avoid this with close tolerance being sacrificed at least during the early period of operation until the tool expands sufficiently to close the excess tolerance. When there are very accurate tool guiding requirements, the tool may be seized and bound after it has been operated for a while.

The production cost of solid tungsten carbide bushing is high because, among other things, the part must be pressed to shape and sintered and then must be ground with a diamond grinding wheel in order to complete the finishing process. Another important disadvantage, which results from the use of a solid tungsten carbide is the inability to manufacture drill bushings with a variety of outside shapes. This is inherent in the material characteristics since solid tungsten carbide is difficult to grind and is brittle.

Accordingly, it is an important object of the invention to provide an article such as a drill bushing which will maintain its accuracy and possess a longer life than the presently used articles. Such an article will maintain the design clearance between bushing and tool because the body is steel and the coating whose thickness ranges from 0.003 – 0.005 inch is composed of tungsten carbide particles distributed throughout a matrix of nickel chrome. This allows the coating to have substantially the same coefficient of expansion as the tool steel body.

It is another object of the invention to provide such an article having an inner surface with the abrasion and wear resistance of similar articles formed of solid tungsten carbide.

It is a further object of the invention to provide such an article which is economical to produce and sells for a fraction of the cost of tungsten drill bushings.

It is a still further object of this invention to circumvent the undesirable feature of solid tungsten carbide or inserted sleeve or ring type bushings to provide in one of its configurations, a bushing which has exposed tool steel at the entering end to thereby avoid tool damage that could occur in the event an off-center tool came in contact with tungsten carbide. Beyond the bellmouth or tapered entry side of the drill bushing the thin layer of tungsten carbide provides the extreme wear resistant surface.

It is yet another object of the invention to provide such an article whose body is formed of alloy or tool steel and which is provided with a thin coating of tungsten carbide particles which are metallurgically bonded in a matrix of nickel chrome to the body.

It is still another object of the invention to provide such an article wherein the tungsten carbide particles of controlled micron size are contained in a matrix of nickel chrome so that the matrix has about the same coefficient of thermal expansion as the body and the drill or rotating shaft inserted in the bushing.

It is a still further object of the invention to provide such an article which has as good or better wear characteristics when compared to solid tungsten carbide articles and also is less likely to chip or crack in use or during installation.

It is yet a further object of the invention to provide such an article which has improved lubrication properties because there is produced within the bushing a surface which is unlike a thin solid surface and which has the interstices between the micron size particles of tungsten carbide filled with matrix material. This is accomplished by controlling the amounts of matrix materials sufficient to insure metallurgical bonding to the bushing proper and avoiding filling all the voids or interstices between the particles. Thus, interstices are left for the passage of oil or lubricants between the tungsten carbide particles even while a solid shaft or tool having a close fit is rotated within the bushing.

It is a still further object of the invention to provide such an article wherein the inside diameter is lined with a thin coating of tungsten carbide and a controlled amount of matrix which when finished to the proper inside diameter dimension leaves a multiplicity of tool bearing points which are generated by the partial cutting of the particles to a condition wherein each particle, so exposed, provides a bearing point while, at the same time, leaving the interstices between particles free to allow lubricant to flow freely.

These and other objects, advantages, features and uses will be apparent during the course of the following description when taken in conjunction with the accompanying drawing.

Broadly, the article of the invention comprises a hollow steel body with various configurations, having a coating of a matrix of a material such as nickel chrome added to the inside diameter thereof. Micron size particles of tungsten carbide are uniformly distributed throughout the matrix provides a metallurgical bond to the steel body and a metallic bond to each such particle. The coating, as applied, has a thickness of the order of between 0.006 and 0.008 inch. Final finishing reduces the thickness to the order of approximately 0.003 inch.

While tungsten carbide particles are preferred, particles of other materials having a hardness of 84 – 93 Rockwell C may also be used. Similarly, a matrix of material having a hardness of 59 – 67 Rockwell C may be used in place of the preferred nickel chrome material.

The body and the matrix have about the same coefficients of thermal expansion so that there is little internal strain introduced as the articles heat up from friction during use. Moreover, the article has almost the same coefficient of thermal expansion as that of the drill or shaft which rotates in the hollow opening so that more accurate fitting is initially possible and there is no binding as the temperature rises during use. The term which is normally used to describe the condition, which occurs when the tool expands at a much faster rate than the bushing, is "seized" or "frozen" which indicates metal-to-metal interference. It is also within the contemplation of the invention to provide an article having a surface which has interstices and voids between the particles of tungsten carbide to allow oil, lubricants or coolants to flow freely or be pumped between the inside wall of the busing and the shaft or tool. Articles of the invention avoid freezing or seizing while still maintaining close clearance between tool and bushing.

In the accompanying drawing, forming a part of this application and in which like numerals are employed to designate like parts throughout the same:

FIG. 1 is a block diagram showing the steps in the method of forming articles of the invention having an inside diameter of the order from about 0.140 inch up to several inches;

FIG. 2 is a perspective view of a machine used for carrying out some of the steps of the method used in the manufacture of articles having an inside diameter of the order of 0.140 to 0.750 inch;

FIG. 3 is a sectional view, taken on lines 3-3 of FIG. 2, viewed in the direction of the arrows;

Figure 4:
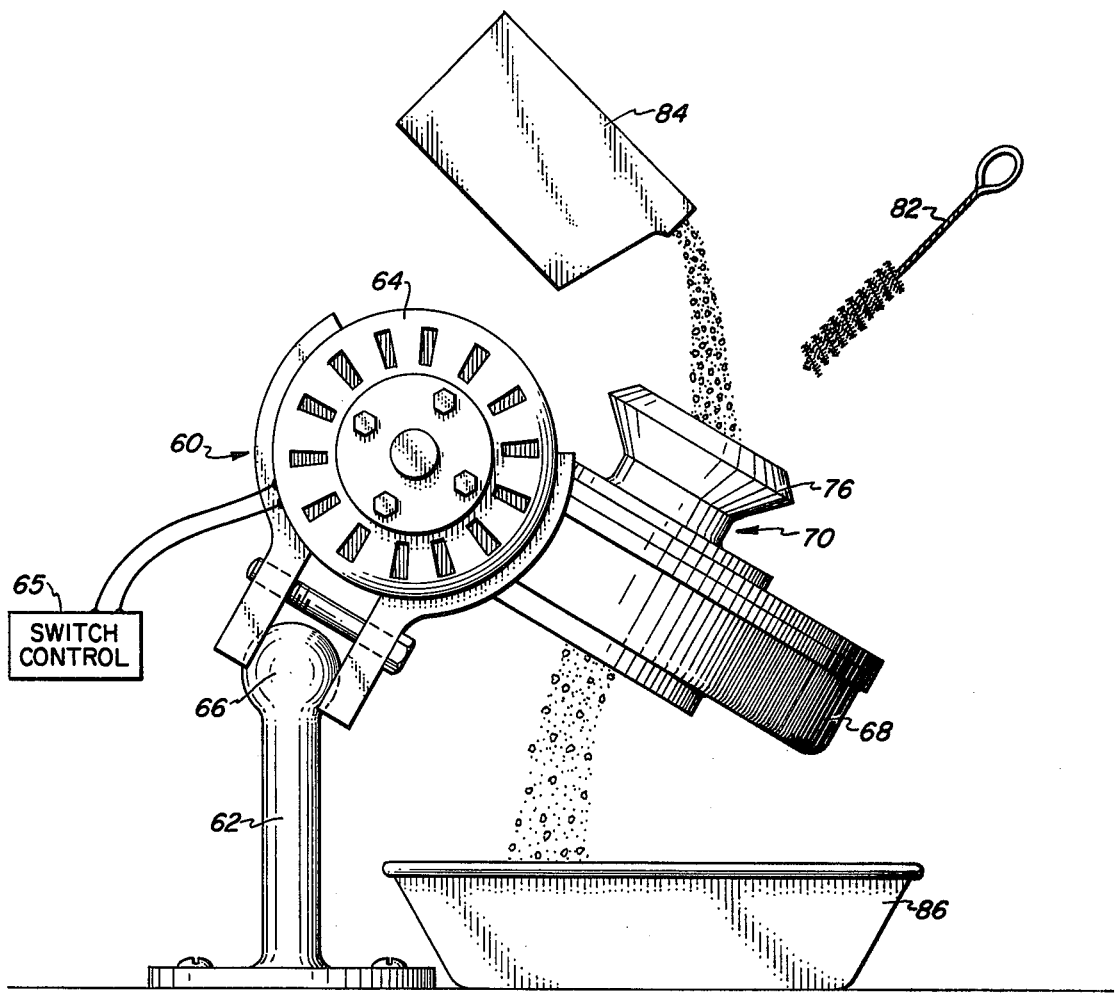
FIG. 4 is a view of the machine of FIG. 2 showing its use in the manufacture of articles of the invention.

In the drawing, wherein, for the purpose of illustration, are shown various embodiments of the invention, the numeral 30 (FIG. 1) designates the step of forming and cleaning the blank. Step 30 is preferably carried out by machining the part on conventional machine tools. The part must be chemically clean and free of oil, dirt or other contaminants. A preferred method of cleaning is to batch clean the articles in a hydrogen atmosphere furnace. This results in metallurgical cleansing of the articles preparatory to the next step.

After the foregoing procedure has been carried out, boric acid dissolved in distilled water (step 32) and micron size powder of nickel chrome (step 34) are combined to force an adhesive (step 35). The adhesive has the consistency of heavy oil. The consistency can be controlled by varying the amount of nickel chrome powder and can be reproduced by accurate control of the ratio of fluid measure to weight of the nickel chrome. Such control insures repetitive consistency of the amount of nickel chrome in suspension. The adhesive so formed is added to the inner surface of the piece (step 36). Next at (step 38), the tungsten carbide particles are applied to the wet adhesive coated surface. The tungsten carbide particles are added while the adhesive is still wet so that they are caught in a manner similar to the result obtained when sugar comes in contact with a wet finger. The amount of such adherence will depend on the mesh size of the particles. The piece is not dried (step 40) at a temperature of the order of 350° – 400° F for the period of time required to bring the part up to uniform temperature and sustained for such time as is required to evaporate all the water and moisture out of the adhesive. To dry articles of the invention on a production basis, the drying (step 40) is done in a conveyor type oven at about 350° – 400° F. The heating time depends on the mass of the part but the heating time and temperature must be sufficient to insure that all water and moisture is evaporated and removed from the part. Now, the part is cooled to room temperature and the adhesive formed in step 35 is applied over the tungsten carbide layer (step 42). It may be necessary to use one or more coats of adhesive because some of it may be soaked up by the tungsten carbide particles.

At step 44, nickel chrome particles of 140 – 250 mesh are applied over the wet adhesive. The number of particles which adhere is determined by the amount of adhesive and the mesh size of nickel chrome as the major parameters. The smaller the mesh size, the more solid the coating, so that if a solid coating, free of voids and with filled interstices, is desired, a small mesh size is used. On the other hand, if it is desirable to leave voids and open interstices for lubrication or other operating functions, larger mesh sizes should be used.

The article is now oven dried (step 46) at temperatures of the order of 350° – 400° F for the amount of time required to bring the piece up to a predetermined temperature which temperature is sustained until all the water is evaporated out of the adhesive. Here, again, the drying is carried out in a conveyor type oven at a temperature of the order of 350° – 400° F for a time which depends on the mass of the article. The cycle should be sufficient to insure that all water and moisture is evaporated from the part. The part is cooled to room temperature (step 47). When cool it is inspected and any excess particles of tungsten carbide and/or adhesive on the surfaces may be removed with a knife or similar instrument.

Next (setp 48) the coating is metallurgically fused to the blank by placing the article in a vacuum furnace, hydrogen atmosphere controlled furnace or in a salt bath furnace, with best results being produced in the vacuum furnace at a temperature of the order between 1925° and 2025° F. The part is held at that temperature for about 3 to 5 minutes to insure that the nickel chrome material reaches the liquidous state and the entrapped gas is evacuated so that the nickel chrome flows into the interstices between the tungsten carbide particles. If the furnace has a quench chamber, the parts go directly from the fusing step to quenching. If it does not, a separate quench bath is required. After quenching, the part is tempered to bring it to the desired hardness. After the part is tempered, the inside diameter of the piece is honed or ground (step 50) and lapped to the proper dimensions and smoothness. The particular technique used to finish the inside diameter (I.D.) of the piece accurately depends upon its size and shape.

The bushing (part or piece) is mounted on a mandrel and the outside diameter (O.D.) is ground to insure concentricity with the I.D. to within 0.0002 inch or less (step 51). Now, using the ground O.D. surface as a chucking surface, the ends and face of the piece are ground to the proper smoothness and dimensions (step 52).

FIGS. 2, 3 and 4 illustrate a machine for carrying out the coating portion of the method for producing articles having an outside diameter of one inch or less and an inside diameter not smaller than about 0.140 inch. The machine is designated by the numeral 60 and is seen to comprise a pedestal 62, a motor 64 which is mounted on the pedestal by means of a universal position ball mount 66 and a drive casing 68. The drive casing 68 contains a gear box and a worm drive for rotating a jig 70. Motor 64 is preferably a d-c gear motor with a foot controlled switch 65. The switch 65 controls the motor speed to permit the operator to vary the motor speed and the jig rotation speed during the coating process.

The jig 70 (FIG. 3) comprises an outer drive ring or worm gear 72 which is driven by a drive 74 so as to rotate a holder 76. The holder 76 is locked in position with respect to drive ring 72 by means of ball lock retainers 78. The bushing to be coated is placed in holder 76 and is held in position by means of one or more spring clips 80.

FIG. 4 illustrates the attitude of machine 60 for coating the inner surface of a bushing piece. The bushing is slipped into place and held by the spring clip 80 (FIG. 2). A brush 82 is used to apply the adhesive to the inner surface of the bushing while the holder is rotated. After the inner surface is coated with adhesive, while wet, tungsten carbide particles are poured from a container 84 into the bell of holder 76 as the holder is rotated. The particles which do not adhere to the piece drop into a recovery pan 86. The piece is then removed from the holder and dried. The piece is reinserted in the holder and is again coated with adhesive and while still wet, nickel chrome or suitable alloy is poured from container 84 into the bell of holder 76. The excess falls into the recovery pan 86, (i.e. those particles which do not adhere to the wet adhesive). The part is then dried. Preferably, the d-c motor 64 is controlled by foot switch 65 to give the operator variable speed control, but any suitable control means may be used with the motor.

Figure 5:
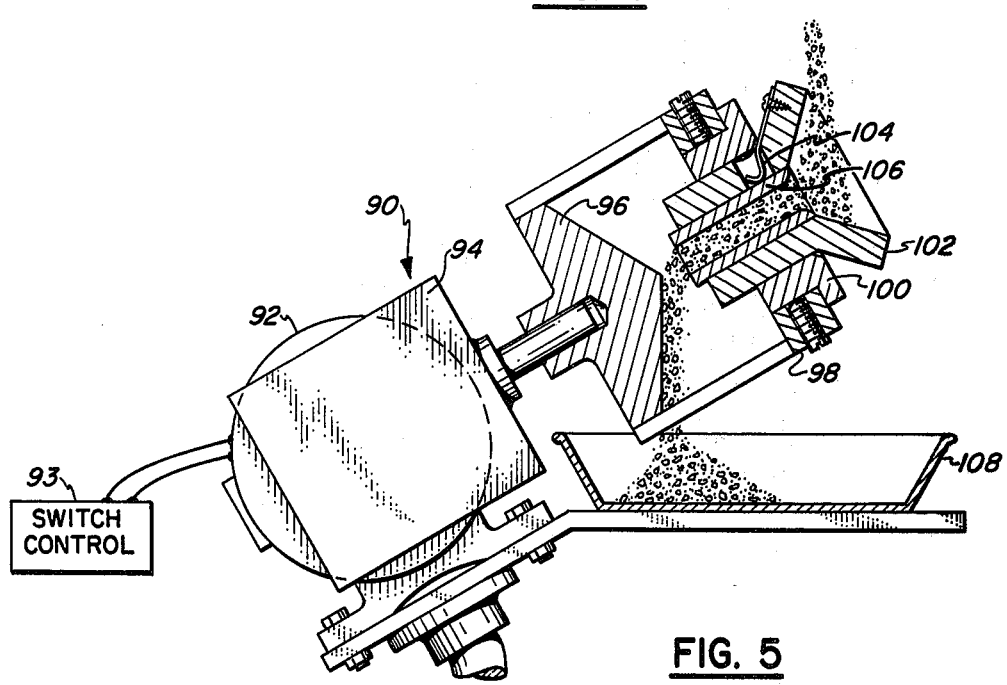
FIG. 5 is a view partly in section, showing a modified machine for use in the manufacture of articles having an inside diameter of the order of 0.750 to 6 inches or more.

FIG. 5 illustrates a modified machine 90 for making articles having inside diameters of the order of about ¾ to 6 inches. This machine is actually larger than that of FIG. 4 but it is drawn to a smaller scale than is FIG. 4. Machine 90 comprises a d-c gear motor 92 which is of variable speed and is foot switch controlled by foot switch 93, which is similar to switch 65, a gear box 94 and a gear hub 96. The gear hub 96 supports and rotates a drive plate 98 inside of which there may be mounted a sleeve 100 which is of the proper size to hold a holder 102 in position. A clip 104 holds a bushing 106 in position. Operation is the same as has previously been described and the nonadhering material is recovered in a pan 108.

Figure 6:
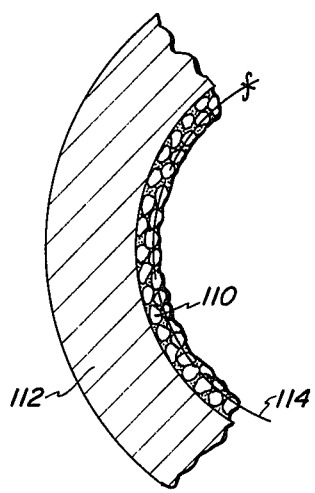
FIG. 6 is an enlarged sectional view of a portion of an article of the invention having a dense coating on the inner surface.

FIG. 6 is an enlarged view showing a portion of the inner surface of an articcle of the invention wherein several layers of a matrix 110 of tungsten carbide and nickel chrome has been fused to the body 112. For the purpose of illustration, the several layers of a matrix 110 are shown as particles, but during the furnace fusing step, the particles of nickel chrome pass into the liquidous state, and fill all the voids and interstices between the tungsten carbide particles, which retain their original shape and do not go into solution. The nickel chrome becomes solidified. It is metal fusion bonded to the inner wall of the bushing, bonding the particles of tungsten carbide and since the adhesive is also a fluxing agent, it allows the surface of the tungsten carbide particles to be wetted and bonded to the nickel chrome. When the surface is finished along the line 114, it can be seen that the surface presents a substantially solid dense surface of tungsten carbide. By properly controlling the particle size of the tungsten carbide, up to 90% or more of the finished surface will be exposed solid tungsten carbide. This depends on the mesh or particle size used and the amount and type of finishing. Each exposed particle of tungsten carbide has an exposed surface of the proper diameter to thereby contribute to the total wear resistant surface. Such an article will possess a long life since the tungsten carbide used is a cast grade ranging up to 9.9 on the MOHR scale. On that scale the diamond is 10.0 and the normal sintered tungsten carbide bushing may only reach 9.3 – 9.4. Consequently, as long or longer life may be expected from bushings of the invention over those of the prior art. This is particularly true when the bushing is used in the processing of abrasive material.

Figure 7:
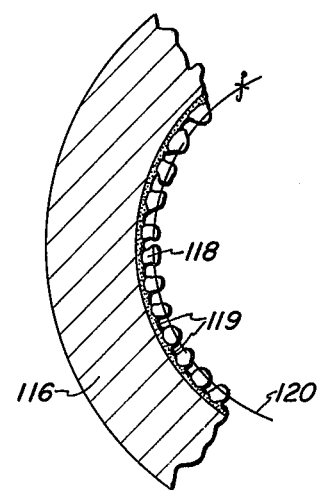
FIG. 7 is a view, similar to that of FIG. 6, showing an article of the invention having interstices between the tungsten carbide particles.

FIG. 7 is a view similar to that of FIG. 6 and shows a body 116 to which an essentially single layer of tungsten carbide particles having their regular blocky shape have been applied and to which has been applied a controlled layer of nickel chrome matrix material. The nickel chrome reaches the liquidous state in the presence of the fluxing agent in the adhesive and the particles of tungsten carbide are wetted with nickel chrome during the furnace fusing step. The excess nickel chrome clings to the wall and gathers in fillets 119 of nickel chrome at the base of each particle of tungsten carbide 118. This provides great mechanical strength against tool pressures and forces. Heat treating follows the fusing stage. When the surface is finished along line 120, it can be seen that the particles of the matrix are dispersed so that the lubricant used during drilling and similar processes can move through the interstices and reduces the likelihood of freezing. The interstices also act as reservoirs of lubricant. However, the wear life of this article will be lower than that of the article of FIG. 6. Either coating structure may be used with the articles of the invention to be described below.

As described heretofore, the article of FIG. 7 will, after grinding, lapping, honing or otherwise finishing the coated surface, be such that each exposed particle of the tungsten carbide now has an exposed surface of the proper diameter. In total, up to 80% or more of the total inner or coated surface will be exposed as a wear resistant surface, but the interstices will provide passages permitting the free flow of lubricants and/or coolants below the finished surface 120.

Figure 8:
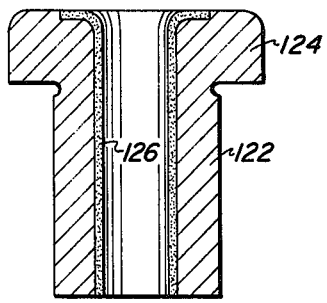
FIG. 8 is a sectional view of an article of the invention having a head and a coating on the inner surface and on a portion of the head.
Figure 19:
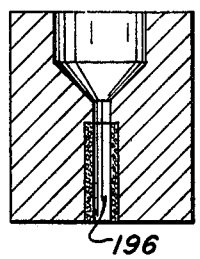

FIG. 8 illustrates an article of the invention for use as a drill bushing having a body 122, a head 124 and a matrix of nickel chrome throughout which are distributed particles of tungsten carbide 126 fused to the inner surface of the body 122 and a portion of the inner surface of the head 124. When bushings of this type are used, there is virtually no wear on the steel forming the head or top of the bushing, the body proper being contained in the drill jig, fixture, etc., but it is recognized that the bell mouth being coated with wear resistant tungsten carbide can damage the cutting edge of a tool formed of high speed steel if the tool enters off center. Consequently, in some operations this coating of the bell mouth is undesirable and leads to the need of the configurations shown in FIGS. 10, 11 and 19.

Figure 9:
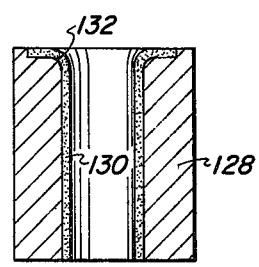
FIG. 9 is a view similar to that of FIG. 8 of a non-headed article of the invention having a coating on the inner surface and on a portion of the top of the article.

FIG. 9 illustrates a bushing having a body 128 and a matrix 130 of tungsten carbide and nickel chrome fused to the inner surface and to a portion of the upper surface as shown at 132. This type of bushing, in general, is a headless type and is used where the working surface must be flat and clear of projections and the bushing must present a flat unobstructed surface. Here again, it may be desirable to utilize an uncoated bell mouth to reduce tool wear.

Figure 10:
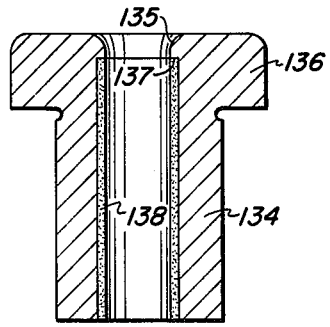
FIG. 10 is a view similar to that of FIG. 8 of a headed article of the invention wherein the head is uncoated.

FIG. 10 illustrates a headed bushing having a body 134, head 136 and a matrix 138 of tungsten carbide and nickel chrome. It is a view similar to FIG. 8, but the article of the invention has the coating only in the inner longitudinal diameter, limited as indicated by the recessed bore stopping at the shoulder 137. There is provided a bell mouth or entrance 135 for the tool or drill which is part of the parent material of the hardened drill bushing body 134 in order to protect the tool cutting edge from damage as it first enters the bushing. Such damage might occur if it were to contact a radial tungsten carbide surface with its cutting edge as shown in the bell mouths of FIGS. 8, 9 and 17. This is particularly true if the tool enters the entry hole 135 off center due to a tool running out of round or oscillating until controlled by the inside diameter of the bushing. It should be noted that run out or some oscillation is not unusual in long tools.

Figure 11:
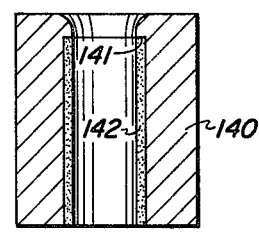
FIG. 11 is a view similar to that of FIG. 9 of a non-headed article of the invention wherein the upper portion of the inner surface is uncoated.

FIG. 11 is a view similar to that of FIG. 9 of a non-headed bushing which comprises a body 140 to the inner surface of which there is applied a matrix 142 of nickel chrome throughout which are distributed particles of tungsten carbide. A shoulder 141 limits the application of the matrix 142 to the area shown in the figure. The bell mouth or entrance 143 for the tool or drill is formed of the parent material of the hardened bushing body and is not covered by the matrix so that the tool is protected from damage as it first enters the bushing. This is particularly true if the tool enters off center due to its running out of round or oscillating until its movement is controlled by the inside diameter of the bushing. It is thus seen that the bushings of FIGS. 10 and 11 are for the same general purpose.

Figure 12:
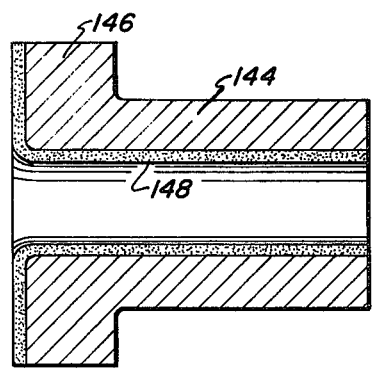
FIG. 12 is a view similar to that of FIG. 8 of a headed article of the invention such as a pump bushing wherein the inner surface and top surface of the head of the article are coated.

FIG. 12 is a view of a pump bearing wherein the inner surface of the body portion 144 and the outer surface of the head 146 are covered with a matrix 148 of nickel chrome throughout which are dispersed micron size particles of tungsten carbide with a thickness in the order of 0.003 – 0.005 inch. Such bearings may also be made with the matrix just covering the outer surfaces of the head 146.

Figure 13:
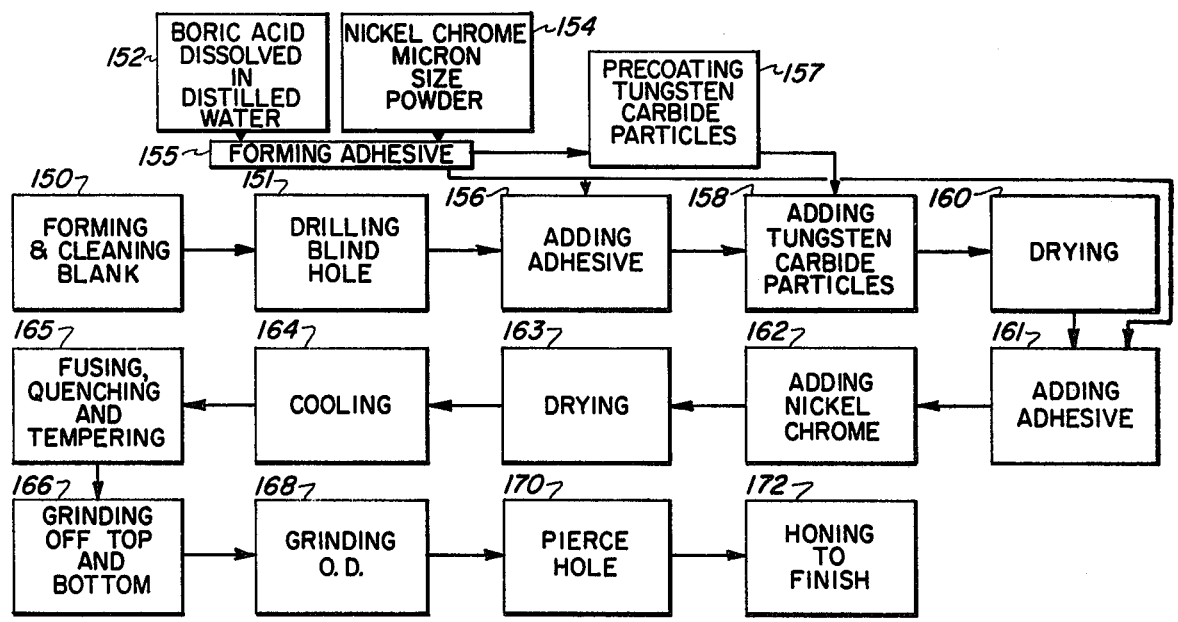
FIG. 13 is a block diagram similar to that of FIG. 1 showing the steps in the formation of small articles of the invention having an inside diameter of the order of 0.005 to 0.140 inch.

FIG. 13 is a block diagram of the method used in the production of small bushings having inside diameters of the order of between 0.005 and 0.140 inch.

The blank is machined on conventional machine tools. Before proceeding with the coating process, the part must be chemically clean and free of any dirt, oil, etc. (step 150). The preferable method is to batch clean the bushings metallurgically in a hydrogen atmosphere controlled furnace. A blind hole is drilled in the blank (step 151). Tungsten carbide particles of the proper mesh size are precoated (step 157) with the adhesive formed in step 155. The adhesive mixture used in step 157 is thin and free-flowing so that there is a low concentration of nickel chrome in suspension. Preferably, the adhesive is poured into a container of the tungsten carbide particles and the combination is thoroughly mixed. The mixture is placed in, for example, a variable speed centrifuge to remove the excess liquid. The wetted mixture is placed in a mixer where it is agitated in the presence of a hot air stream. This is done to dry both the adhesive coating and its nickel chrome powder on the individual tungsten carbide particles and to separate the particles.

Before the mixture is completely dried, the particles are lightly sprayed or dusted with a dry fog of nickel chrome powder which will adhere to the wet adhesive. This insures that there will be an adequate supply of nickel chrome to form fillets between the points of contact of the tungsten carbide particles and the body of the bushing. A greater quantity of precoated particles may be produced than is needed as the excess, after it is completely dry, may be stored in sealed containers for future use.

Now, boric acid dissolved in distilled water (step 152) and nickel chrome micron size powder (step 154) are added together to form an adhesive 155 having a consistency of heavy oil which can be varied in its consistency by using more or less nickel chrome powder. This can be accurately measured and reproduced by using predetermined ratios for fluid measure (step 152) to weight of nickel chrome (step 154) to insure repetitive consistency and the correct amount of nickel chrome in suspension in the adhesive. Now, (step 156) adhesive is applied to the inner surface of the longitudinal blind axial opening in the bushing. Next (step 158) the dry, precoated tungsten carbide particles of a predetermined mesh are placed in the longitudinal blind axial hole which had been drilled in the blank to a level which will assure an excess when the top is cut off in subsequent operations. Now the articles are dried (step 160) by being placed in a conveyor type oven at about 350° to 400° F. The part remains in the oven until it reaches the established temperature and all moisture or water is evaporated out of the adhesive. The part is then allowed to cool at room temperature. Now, (step 161) adhesive is applied to the exposed projecting tungsten carbide particles and into the cavity formed by the coffer dam. Next, (step 162) a measured amount of nickel chrome is added to the top of the piece partially filling the coffer dam, and a few drops of adhesive are added into the small mass of nickel chrome powder in order to saturate the nickel chrome. There must be a sufficient amount of nickel chrome to insure that all the interstices between the tungsten carbide particles are filled with nickel chrome. The bushing is now dried (step 163) by being placed in a conveyor type oven at about 350° to 400° F until the part reaches that temperature at which all moisture or water is evaporated out of the adhesive. The part is then allowed to cool at room temperature (step 164). Now, (step 165) the bushing is placed in a vacuum furnace, hydrogen atmosphere controlled furnace or salt bath furnace at a temperature of the order of 1925° to 2025° F until the part has reached the desired temperature and is held at that point for 3 to 5 minutes. As the furnace is cooled down, the parts are removed at proper temperature for heat treating, quenched in the proper medium and then put through an annealing stage for the proper steel bushing hardness. This completes step 165. If a vacuum furnace is used, it is possible to move the bushing directly into a heat treating stage for quenching followed by annealing. At step 166 the top and bottom of the piece are ground off which removes the coffer profile as well. Now, the outside diameter is ground to the desired size and smoothness (step 168) and a hole of the desired size is pierced in the fused matrix (step 170). This pierced step may be carried out by either electrode discharge machining, electro chemical piercing, or in the case of very small holes, a laser beam can be used. Finally, the piece is honed and lapped to a final finished inside diameter and surface finish (step 172).

Figure 14:
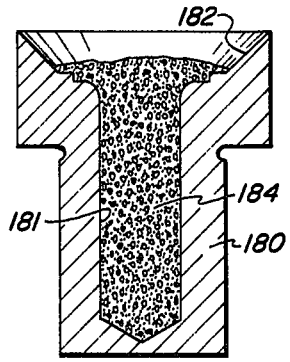
FIGS. 14-17 illustrate some of the steps used in the manufacture of articles of the invention having inside diameters of the order of 0.005 to 0.140 inch.
Figure 15:
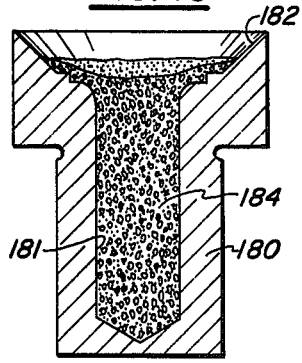
Figure 16:
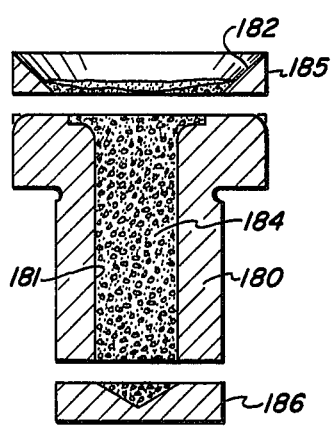
Figure 17:
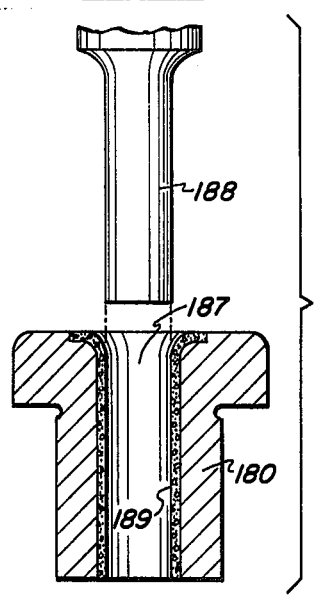

FIGS. 14–17 illustrate some of the steps used to produce a bushing of the configuration shown in FIG. 8, having an inside diameter between 0.0135 and 0.140 inch and an outside diameter between 0.250 and 0.500 inch. In FIG. 14, the illustration shows a piece 180 into the top of which a coffer dam 182 has been machined during the process described in connection with FIG. 13 (step 150). Following the steps depicted in FIG. 13, the adhesive which is produced by mixing 152 and 154 of FIG. 13 is in step 156 applied to the wall of the longitudinal blind axial hole 181 in piece 180 of FIG. 14. Then in (step 158) this hole is filled with precoated particles 184 as illustrated in FIG. 14 and is dried in an oven as has been described (step 160). FIG. 15, shows the manner in which, after fusion, the small mound of nickel chrome has, in the liquidous state, seeped down between the particles of tungsten carbide filling all crevices and interstices between the particles to form a solid plug of tungsten carbide in a matrix of nickel chrome. The plug is of a predetermined diameter which will leave a wall thickness of about 0.003 to 0.005 inch after finishing. After cooling (step 164) and tempering (step 165) the top 185 and bottom 186 are ground off in step 166 (FIG. 16). The outside diameter is centerless ground (step 168) and then the hole is pierced using electro discharge machining, electro chemical machining or laser beam to pierce a hole 187 (step 170). Next, final honing and lapping is done to the proper diameter (step 172). FIG. 17 shows the finished bushing formed by means of electro discharge machining, electro chemical machining or a similar method as may be required. The electrode for an electro discharge machine is shown at 188 and the finished hole designated 187 is seen to have a suitable coating 189.

Figure 18:
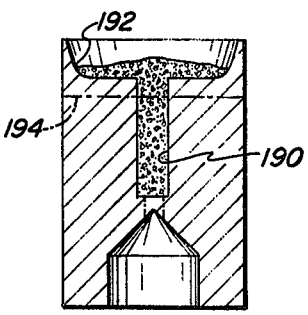
FIGS. 18 and 19 illustrate two of the steps used in the manufacture of articles of the invention having inside diameters of the order of 0.005 to 0.140 inch.

FIG. 18 illustrates a step in the method of producing very small bushings having inside diameters of the order from 0.005 to 0.140 inch and outside diameters of the order from 0.250 to 0.437 inch. The opening 190 which is a square bottom longitudinal blind axial opening is coated with adhesive which is also a fluxing agent derived from mixing (step 152) and (step 154). The opening is then filled with particles of tungsten carbide of a predetermined mesh which have been precoated with a dry coating of adhesive. This is equivalent to step 158 in FIG. 13. The piece is now dried as in step 160 of FIG. 13. The top cavity formed by coffer dam 192 has adhesive applied including the inside cavity formed by the coffer dam which is equivalent to step 161 and now, in the next step which is equivalent to step 162 of FIG. 13 particles of nickel chrome powder are placed in the coffer dam cavity while the adhesive is still wet with additional drops of adhesive added and the measured quantity of nickel chrome to insure that there is sufficient reservoir of metal during fusing (step 164 of FIG. 13) so that all cavities and interstices between the particles of tungsten carbide are filled to form a solid plug of tungsten carbide in a nickel chrome matrix. Prior to fusing (step 165) a drying stage must be completed which is equivalent to step 163 in FIG. 13. The piece may be taken out of the furnace at the proper temperature and quenched for hardening and then followed by annealing. Now, in step 166 of FIG. 13, any suitable method may be used to remove the top along line 194. At the same time the opposite end is sized to obtain the proper overall length of the bushing. In the next step equivalent to step 168 of FIG. 13, the outside diameter is finished to its final outside diameter and surface finish. Next, the longitudinal axial opening is pierced through as described in connection with step 170 of FIG. 13, using electro discharge machining, electro chemical machining, or a laser beam, for a very small hole. This piercing may be done for improved concentricity while the piece is rotated, but stationary mounting also can be used. Now the pierced longitudinal opening 196 in FIG. 19 may be honed and lapped to its final diameter and surface finish. Any deburring, etc., part marking and other aids for the user are carried out at this last stage.

While particular embodiments of the invention have been shown and described, it is apparent to those skilled in the art that modifications are possible without departing from the spirit of the invention or the scope of the subjoined claims.

The embodiments of the invention in which an exclusive property or privilege is claimed are defined as follows:

1. An article of manufacture for accurately confining a cylindrical element rotating about its longitudinal axis comprising:
    a body formed of a relatively rigid material such as steel and having a longitudinal opening therein;
    a liner of particles having a hardness of 84 – 93 Rockwell C in a matrix of material having a hardness of 59 – 67 Rockwell C bonded to at least a portion of the longitudinal opening in the body and having an opening therein to receive the cylindrical element and to permit said cylindrical element to rotate freely therein;
    the liner being such that the liner and the body together have a coefficient of thermal expansion substantially equal to that of the cylindrical element to thereby accurately maintain the position of the cylindrical element as it rotates and confine it to rotation about its longitudinal axis.

2. The invention of claim 1 wherein the particles of material having a hardness of 84 – 93 Rockwell C are tungsten carbide.

3. The invention of claim 1 wherein the matrix of material having a hardness of 59 – 67 Rockwell C is nickel chrome.

4. The invention of claim 3 wherein the particles of material having a hardness of 84 – 93 Rockwell C are tungsten carbide.

5. The invention of claim 4 wherein:
    the liner comprises a plurality of layers of tungsten carbide particles.

6. The invention of claim 4 wherein:
    the liner comprises a single layer of tungsten carbide particles.

7. The invention of claim 4 wherein:
    the longitudinal opening is a cylinder and is provided with an outwardly flared portion at one end thereof.

8. The invention of claim 7 wherein:
    the liner comprises a plurality of layers of tungsten carbide particles.

9. The invention of claim 7 wherein:
    the liner comprises a single layer of tungsten carbide particles.

10. The invention of claim 7 wherein:
    the longitudinal opening is a right circular cylinder.

11. The invention of claim 10 wherein:
    the liner comprises a plurality of layers of tungsten carbide particles.

12. The invention of claim 10 wherein:
    the liner comprises a single layer of tungsten carbide particles.

13. The invention of claim 7 wherein:
    the end portion of the body containing the outward flare is of a larger diameter than the balance of the body.

14. The invention of claim 13 wherein:
    the liner comprises a plurality of layers of tungsten carbide particles.

15. The invention of claim 13 wherein:
    the liner comprises a single layer of tungsten carbide particles.

16. The invention of claim 13 wherein:
    the liner is applied to the outwardly flared portion.

17. The invention of claim 16 wherein:
    the liner comprises a plurality of layers of tungsten carbide particles.

18. The invention of claim 16 wherein:
    the liner comprises a single layer of tungsten carbide particles.

19. The invention of claim 7 wherein:
    the liner is applied to the outwardly flared portion.

20. The invention of claim 19 wherein:
    the liner comprises a plurality of layers of tungsten carbide particles.

21. The invention of claim 19 wherein:
    the liner comprises a single layer of tungsten carbide particles.

* * * * *